United States Patent
Biehler

(10) Patent No.: US 9,325,574 B2
(45) Date of Patent: Apr. 26, 2016

(54) METHOD AND CONFIGURATION COMPONENT FOR ASSIGNING A STATION NAME TO COMPONENTS OF AN INDUSTRIAL AUTOMATION ARRANGEMENT

(71) Applicant: Siemens Aktiengesellschaft, Munich (DE)

(72) Inventor: Georg Biehler, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 463 days.

(21) Appl. No.: 13/765,219

(22) Filed: Feb. 12, 2013

(65) Prior Publication Data

US 2013/0212238 A1  Aug. 15, 2013

(30) Foreign Application Priority Data

Feb. 14, 2012 (EP) .................................... 12155367

(51) Int. Cl.
*H04L 12/24* (2006.01)
*G05B 19/05* (2006.01)
*G05B 19/418* (2006.01)

(52) U.S. Cl.
CPC ............ *H04L 41/0806* (2013.01); *G05B 19/05* (2013.01); *G05B 19/056* (2013.01); *G05B 19/41845* (2013.01); *G05B 2219/31166* (2013.01); *Y02P 90/16* (2015.11); *Y02P 90/18* (2015.11)

(58) Field of Classification Search
CPC ............. G05B 19/41845; G05B 19/05; G05B 19/056; G05B 2219/31166; H04L 41/0806
See application file for complete search history.

(56) References Cited

U.S. PATENT DOCUMENTS

| | | | | |
|---|---|---|---|---|
| 5,369,758 A | * | 11/1994 | Larson et al. | 714/6.32 |
| 6,032,208 A | | 2/2000 | Nixon et al. | |
| 6,728,262 B1 | | 4/2004 | Woram | |
| 7,809,534 B2 | * | 10/2010 | Sturrock | G05B 17/02 700/37 |
| 2008/0097636 A1 | * | 4/2008 | Kline, Jr. | G05B 19/41865 700/103 |
| 2008/0320549 A1 | * | 12/2008 | Bertino | G06F 21/604 726/1 |
| 2009/0300176 A1 | * | 12/2009 | Shizuno | 709/224 |
| 2010/0094433 A1 | * | 4/2010 | Lessmann | 700/19 |

(Continued)

FOREIGN PATENT DOCUMENTS

CN  1996265  7/2007

*Primary Examiner* — Brian J Gillis
*Assistant Examiner* — Gil H. Lee
(74) *Attorney, Agent, or Firm* — Cozen O'Connor

(57) ABSTRACT

A method and a configuration component for assigning a respective station name to a plurality of components of an industrial automation arrangement, wherein projected components are each allocated a station name and a number of projected properties in a project. During a startup phase or an operating time of the automation arrangement, the configuration component ascertains the components in the data network are ascertained, retrieves information about respective actual properties of the ascertained components, determines a respective similarity value for each ascertained component in relation to the projected components using the degree of match between the actual properties and projected properties, and assigns to each ascertained components the projected station name of that projected component having the best similarity value to allow partial or complete automation of the process of assigning station names, even if some of the properties of the projected and ascertained components differ from one another.

21 Claims, 2 Drawing Sheets

(56) References Cited

U.S. PATENT DOCUMENTS

2011/0016118 A1* 1/2011 Edala et al. .................. 707/730
2012/0002013 A1* 1/2012 Asanuma ...................... 348/46
2013/0096901 A1* 4/2013 Gellerich et al. ............... 703/13

* cited by examiner

|  | AK1 | AK2 | AK3 | ... |
|---|---|---|---|---|
| PK1 | A11 | A21 | A31 | ... |
| PK2 | A21 | A22 | A23 | ... |
| PK3 | A31 | A23 | A33 | ... |
| ... | ... | ... | ... | ... |

METHOD AND CONFIGURATION COMPONENT FOR ASSIGNING A STATION NAME TO COMPONENTS OF AN INDUSTRIAL AUTOMATION ARRANGEMENT

BACKGROUND OF THE INVENTION

1. Field of the Invention

The invention relates to a method for assigning a station name to a number of components of an industrial automation arrangement, and to a configuration component for assigning a station name to a number of components of the industrial automation arrangement.

2. Description of the Related Art

In data networks, network components have a network address. In the case of the known Ethernet-based networks, this is the Internet Protocol (IP) address, for example, with the components (network devices) additionally also having a hardware address, known as the address Media Access Control address (MAC). While the (MAC) address of each component, as just mentioned, is permanently programmed and also each MAC address is allocated only once, the IP addresses can be assigned dynamically, which means that one and the same device or one and the same component can have different network addresses at different times.

In industrial automation arrangements, data networks are frequently used with communication protocols that are optimized for this purpose, such as the PROFINET IO protocol. To ensure correct communication even in the case of changing network addresses (IP addresses) or when components are interchanged, i.e., when the MAC addresses are changed, the message interchange in industrial automation arrangements in productive operation is based primarily on device names, usually called "station names" in this context, which are assigned to the components. These names are likewise explicit in a communication network or subnetwork; for example, the relevant parameter is called "NameOfStation". When an automation arrangement or a network segment is started up, it is thus necessary for all components that are subsequently intended to participate in the message interchange via the network to be configured with a respective explicit station name "NameOfStation". To this end, the known programming environments, such as the products STEP7 or TIA portal from Siemens, have functions available, such as "edit Ethernet subscriber" or "allocate device name". Similarly, standalone configuration tools or configuration components are known, for example the programs Primary Setup Tool (PST) or PRONETA. In this case, a—possibly automatically created—list of all active components in the network or in the subnetwork (network segment) is created, with the user having to search this list, known as the "lifelist", for every single device in his projected configuration to identify the device or the component that is intended to be assigned a projected device name.

Particularly in the case of complex automation arrangements with many components and devices, this "lifelist" may be very extensive, which makes the assignment process confusing and complex. As a remedy, it is a known practice for the "lifelist" to display only devices and components of a particular device type or to display only such devices and components as still having no associated device name. Although this allows the outlined problem to be alleviated, it usually cannot be eliminated. Likewise, it is possible to search the "lifelist" for a particular, known MAC address, but this means that a user needs to know beforehand what MAC address a device or component to be configured has. Overall, the process of configuring the components and devices in a network or in a network segment with device names is not very user friendly and hence is often susceptible to error.

SUMMARY OF THE INVENTION

It is therefore an object of the present invention to simplify the assignment of device names in industrial automation arrangements.

This and other objects and advantages are achieved in accordance with the invention by a method for assigning a respective station name to a number of components of an industrial automation arrangement is proposed, where the components are connected to a configuration component by a data network, and where during a projection phase some or all of the components are recorded in a project for the configuration component, each of these projected components being allocated a station name and a number of projected properties in the project. In this case, during a startup phase or during the operating time of the automation arrangement, the configuration component performs the following method steps for the assignment: a number of or all components which can be reached via the data network are ascertained in a first step. Information about respective actual properties of the ascertained components is then retrieved and stored from the latter in a second step. A respective similarity value for each ascertained component in relation to the projected components is now determined using the degree of match between the actual properties of the ascertained components and the projected properties of the projected components in a third step. Each of some or all ascertained components are assigned the projected station name of that projected component for which there is the best similarity value in a fourth step. This method allows largely automatic assignment of the projected station names to the components and devices that are actually present in the automation arrangement to be performed.

A central concept for the way in which the invention achieves the described object is that the projected devices with their projected device names each have projected (that is to say planned) properties, and the components and devices which are actually present in the actually existing automation arrangement essentially need to correspond to the projected components and devices, i.e., they must have similar properties. According to the invention, a projected device name or station name therefore needs to be assigned to that real device or component which is most similar to or even matches a projected device in terms of the properties thereof. Since, in the "real world", it is not always the case that precisely those devices with those properties or with that design are used which were originally intended or projected for the purpose, the invention needs to determine a measure of the match, what is known as a "similarity value", between each real component and each projected component, with a match or a very high similarity value being intended to automatically prompt the respective proposal, or even, at the same time, the automatic assignment, of a station name for the real device.

It is also an object of the invention to provide a configuration component for assigning a respective station name to a number of components of an industrial automation arrangement, where the components are connected to the configuration component by means of a data network, where single instances or all of the components are recorded in a project for the configuration component, and where these projected components are each allocated a station name and a number of projected properties in the project. Here, the configuration component is set up such that during a startup phase or during an operating time of the automation arrangement the configuration component ascertains a number of or all components which can be reached via the data network in a first step, retrieves and stores information about respective actual properties of the ascertained components from the latter in a second step, determines a respective similarity value for each ascertained component in relation to the projected components using the degree of match between the actual properties of the ascertained components and the projected properties of the projected components in a third step, and assigns each of some or all ascertained components the projected station name of that projected component for which there is the best similarity value in a fourth step. Such a configuration component allows the implementation of the advantages described in connection with the method according to the invention.

In one advantageous embodiment, it is possible to determine vicinity relationships between the components and devices that are actually present and to relate them to the vicinity relationships between the projected components. This means that, for example, it is possible to determine which "vicinal" device or component is connected to a particular network port on a component, where it is likewise possible in the projected automation arrangement to determine which "vicinal" device or component is intended for a particular network port on a projected component. If these vicinity relationships match, a similarity value between the real component under consideration and the projected component under consideration can be increased. On the other hand, if the vicinity relationships do not match, the similarity value between the real component under consideration and the projected component under consideration can be decreased.

A further simplification of the method and hence an increase in functional reliability are obtained when the projected components and the ascertained (real) components are each distinguished according to device types, where the similarity values are each determined between projected and ascertained components of the same device type in the third step of the method and are used in the fourth step. By way of example, this can be implemented by setting a similarity value between components of different type fundamentally to zero or excluding a similarity in a similar manner. In the case of device types and components which, although not identical, are able to represent a substituted (for example, an I/O module with 16-bit digital input instead of 8-bit digital input), it is possible to use an average for the similarity value, for example, for this property and to add it to an existing similarity value, formed from other properties, or to multiply it by such a similarity value. Equally, the disclosed embodiments of the invention allows the possibly fully automatic assignment to be limited to particular device types, which can likewise increase operational reliability and furthermore allows a complex automation arrangement to be started up step by step.

If an ascertained (found) component still has no network address (IP address), it is advantageous to assign a temporary communication address (IP address) for the purpose of assigning the station name to this component.

In order to manage the similarity relationships between the real and projected components, i.e., the ascertained and planned components, it is advantageously possible to create at least one similarity matrix, where the fields of the similarity matrix can each be used to store a similarity value between a projected (planned) and an ascertained (real) instance of the components. In this case, each similarity value can be formed from the comparisons between a multiplicity of individual properties, for example, by adding or multiplying individual property-related similarity values.

Advantageously, the communication protocol PROFINET IO (or another communication protocol) specialized for automation arrangements is used in the data network, because it is thereby possible to read the properties which govern automation components from the real, ascertained components, for example, by special query messages and the consequently possible retrieval of standardized data records which are defined in the PROFINET IO protocol or similar protocols for the protocol-based components.

While the similarity values between the mutually corresponding components will be very high, and there will be a low similarity value for the other components, when the projected components can be mapped onto the ascertained, real components explicitly, indifferent cases may also arise in real automation arrangements. In this case, it may be advantageous, at least in the cases in which a predefined interval value between the best similarity value and the second best similarity value is undershot, to output a query message to a user prior to automatic assignment of a station name to the relevant component, which means that a configuration component merely makes a proposal for an assignment but the ultimate decision about the assignment of a station name remains with a user. To this end, it is possible to input threshold values for a minimum interval between the best similarity value and the subsequent similarity values. Such threshold values may be of either absolute or relative nature.

Fuzzy logic has been found to be particularly suitable for creating and evaluating similarity values, the methods known for the fuzzy logic being able to take particularly good account of the fact that the automation arrangement which has really been set up does not correspond to the planned, projected automation arrangement in all details.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

An exemplary embodiment of the method according to the invention is explained below with reference to the drawings. The method is simultaneously used to explain a configuration component according to the invention in which drawings.

DETAILED DESCRIPTION OF THE PREFERRED EMBODIMENTS

Figures 1, 2:
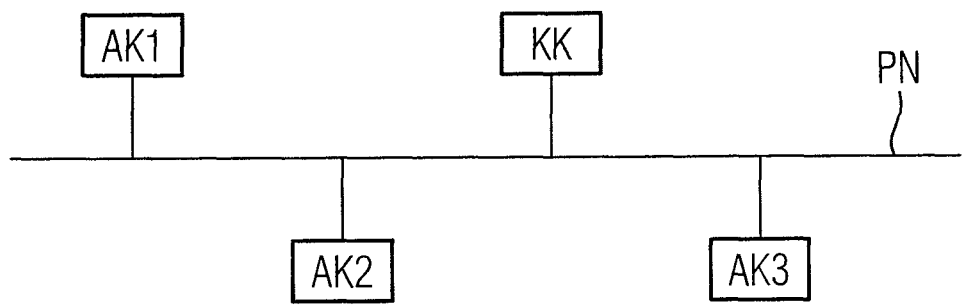
FIG. 1 shows a schematic illustration of an automation arrangement comprising a data network, a plurality of components (automation components) and a configuration component.
FIG. 2 shows an exemplary similarity matrix with similarity values.

FIG. 1 shows a data network PN, for example a PROFINET IO, an Industrial Ethernet or another data network that is customary in automation engineering and to which the components AK1, AK2, AK3 are connected. These are customary microprocessor-controlled devices in automation engineering, for example, what are known as controllers (PLC=Programmable Logic Controller), operating and observation devices (HMI—Human Machine Interface), local peripheral devices, actuators, sensors or the like. Furthermore, the data network PN has a configuration component KK connected to it, this being able to be a known projection and programming unit, for example, this one being programmed to perform the method according to the invention, however. It will subsequently be assumed that the components AK1, AK2, AK3 have been added to what is known as a "project" in a projection phase, i.e., the have been provided for interaction for the purpose of performing an automation task. The "project", in which device type, device properties, relationships between the components AK1, AK2, AK3 and the software thereof are documented, is stored as a file or as a multiplicity of related files in the configuration component KK or, in an alternative embodiment, can be accessed at least via the configuration component KK. The actual arrangement shown in FIG. 1 largely corresponds to the projected arrangement in the "project" in this case. While the arrangement shown in FIG. 1 is a very simple arrangement for reasons of clarity, a real arrangement and hence also a "project" may in practice comprise an almost unlimited number of widely differing components, devices, network segments and also a plurality of configuration components KK.

For the automation arrangement shown to operate productively, the components AK1, AK2, AK3 need to be provided with a station name. In order to assign this station name, the configuration component KK performs a configuration function. In a real installation with a multiplicity of components and component types, components can be prefiltered or distinguished according to device type, with the result that only some of the available components are provided with station names during a "session". For reasons of clarity, this distinction is not made using the present exemplary embodiment, however.

When the described function, which may have the name "allocate device name", for example, has been started, the configuration component KK ascertains all components AK1, AK2, AK3 (devices) of the data network PN or of a considered segment of the data network PN, for example using the service "DCP::Identify(All)" defined in the PROFINET IO protocol. In an optional step which now follows, the filtering according to the device types which the project contains, which has already been described, can be performed and, as a result, a subset of the results list can be formed; in the case of the exemplary communication protocol already described, this can be done by actually reading the device type ("VendorID/DeviceID") from the data record "DCP::IdentifyResponse" retrieved from the individual components and devices.

In an optional step, it may be necessary to temporarily assign components found, as well as a network address that is unallocated (for example, IP address).

In a step which then follows, further property information is retrieved from the components AK1, AK2, AK3 which have been found and possibly filtered out, with a data record "AutoConfiguration" (0xF850) or alternatively, if this data record does not exist, the data record "APIData" (0xF821) and, for each Application Programming Interface (API) mentioned in this data record, the API-granular data record "RealIdentificationData for one API" (0xF000) being retrieved from each of the components AK1, AK2, AK3, for example. From these ascertained data records and information, the current "expansion" of the respective component AK1, AK2, AK3 can be determined, i.e., a list of available modules and respective submodules contained in these modules, for example. A further data record "PDRealData" (0xF841) of interest contains a statement "PDPortDataReal" for the individual ports of the device or of component AK1, AK2, AK3, for example. For this, it is possible to derive the current "vicinity" of the device based on the names or based on MAC addresses of the components connected to the ports.

FIG. 2 schematically shows a table, i.e., a "similarity matrix", which is used to relate the data (captured by means of the preceding steps) from the components AK1, AK2, AK3 actually found in the automation arrangement to projected components PK1, PK2, PK3 in the "project". In this case, the components AK1, AK2, AK3 which are actually available and which have been ascertained in the preceding steps are arranged in the columns and the projected components PK1, PK2, PK3 are arranged in the rows of the similarity matrix. The cells of the matrix which are situated at the points of intersection of the projected and actually available components are used to enter similarity values $A11, \ldots, A33$, which are initialized with the value "zero", for example, at the beginning of the evaluation. The projected components PK1, PK2, PK3 are each successively compared with all or at least a selection of the ascertained components AK1, AK2, AK3. If the device type is not matched, for example, then the similarity value is set to n/a ("not applicable"), for example; the comparison can be continued for the next device. The expansion ascertained "online", i.e., the properties of the components AK1, AK2, AK3 that are actually available, is compared with the "expansion" projected offline, i.e., the projected properties of the projected components PK1, PK2, PK3. If the module/submodule projected offline matches that ascertained "online" or is a suitable substitute, the similarity value is increased; otherwise it is decreased. If a component AK1, AK2, AK3 found has modules or submodules that are not available in the projection, the similarity value is advantageously not meant to be altered.

Similarly, the "vicinity relationships" between the ascertained and projected components are compared, these comparisons being oriented to what are known as the "ports", i.e., to the communication interfaces of the components. If, for example, a "port" has what is known as a "topology" projected for it that leads to a similar device "online", then the similarity value can be increased. Advantageously, the device shown or projected in the "topology" can likewise be compared in this case, with the result that, for example, the similarity value is significantly increased only if the device found on a "port" is of the same type or has a similar design as or to the other device or component projected on the same "port". Otherwise, the similarity value can remain neutral or can even be decreased, for example.

If the example shown in FIG. 2 has the projected component PK1 corresponding, in terms of its projected properties, precisely to the ascertained component AK1, and the same applies accordingly to the components AK2/PK2 and AK3/PK3, then the similarity values $A11, A22, A33$ are accordingly at a maximum (for example 1), and the other similarity values $A21, \ldots, A31$, are accordingly at a minimum, for example "zero". In such a case, the configuration component KK can assume an explicit association and can automatically assign the component AK1 the station name associated with component PK1 in the project, and react accordingly for components AK2 and AK3.

If the similarity matrix produces a less explicit result, the components checked in such a manner can be presented to a user in a dialog step in a list, for example, specifically such that the most "suitable" devices, i.e., those that are most probably suitable for assigning a particular station name, are shown at the very top of a list, for example. Discrepancies between the properties of the ascertained components AK1, AK2, AK3 and the projected components PK1, PK2, PK3 associated via the automatic configuration can each be marked or emphasized in this case. This makes it a simple manner for a user to confirm or reject and correct a proposal from a configuration component.

The previously shown calculation of these similarity values can be performed by the methods of what is known as "fuzzy logic" to prevent only exactly identical components with exactly fitting properties from being able to be found and allocated during the operating time. Even in cases in which automatic allocation of the projected station names to the components AK1, AK2, AK3 found cannot be performed, the disclosed embodiments of the method can at least make a preselection, which increases clarity in the relevant dialog with the configuration component KK and hence reduces the work complexity. The disclosed embodiments of the method can furthermore be used, following failure of individual components AK1, AK2, AK3 and replacement thereof with new components having possibly different MAC addresses etc., to identify these new components that have been inserted as a replacement, to provide them with a station name and hence to automatically incorporate them into the operation of the automation arrangement.

Figure 3:
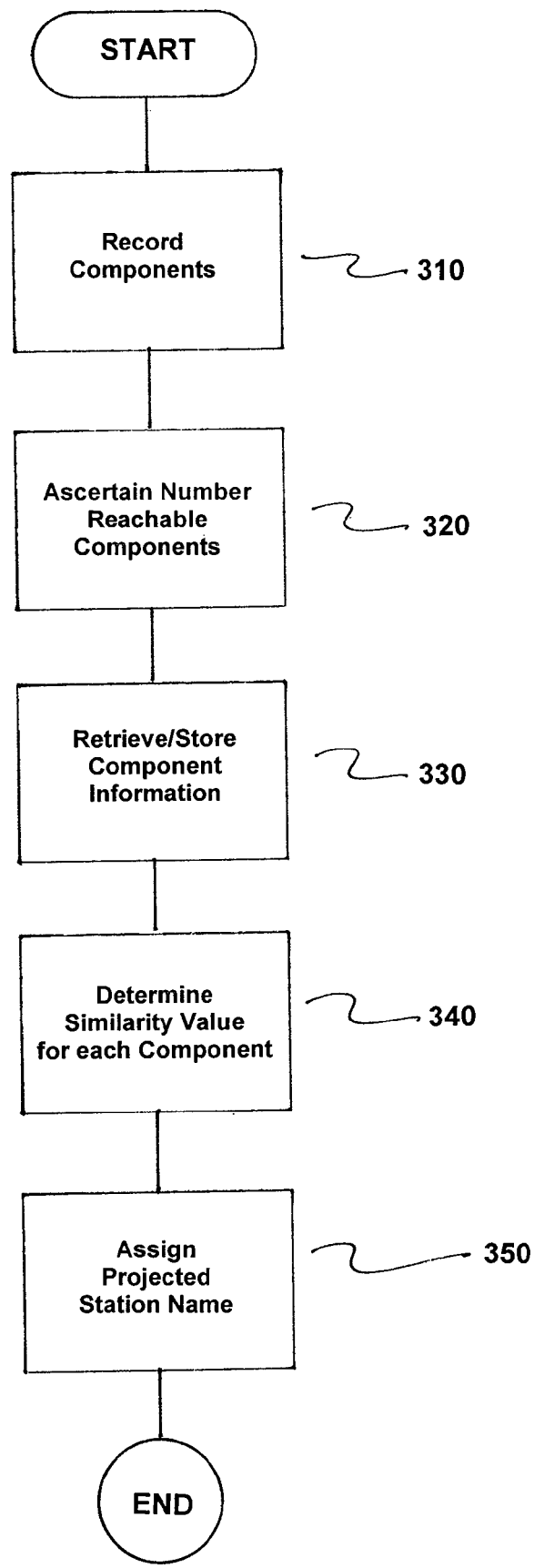
FIG. 3 shows a flowchart of the method in accordance with the invention.

FIG. 3 is a flow chart of a method for assigning a respective station name to a plurality of components of an industrial automation arrangement, where the components are connected to a configuration component by a data network. The method comprises recording some or all of the plurality of components in a project for the configuration component during a projection phase to form a plurality of projected components each allocated a station name and a number of projected properties in the project, as indicated in step 310.

Next, a number of or all components of the plurality of components which can be reached via the data network is ascertained by the configuration component during either a startup phase or an operating time of the automation arrangement, as indicated in step 320. The configuration component then retrieves and stores information about respective actual properties of the ascertained components from the plurality of components during either the startup phase or the operating time of the automation arrangement, as indicated in step 330.

The configuration component then determines a respective similarity value for each ascertained component in relation to the plurality of projected components using a degree of match between the actual properties of the ascertained components and the plurality of projected properties of the plurality of projected components during either the startup phase or the operating time of the automation arrangement, as indicated in step 340. The configuration component then assigns, to each of some or all ascertained components, the projected station name of that projected component for which there is a best similarity value during one of the startup phase and the operating time of the automation arrangement, as indicated in step 350.

While there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention.

Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for assigning a respective station name to a plurality of components of an industrial automation arrangement, wherein the components are connected to a configuration component of the industrial automation arrangement by a data network, the method comprising the steps of:

recording some or all of the plurality of components in a project for the configuration component of the industrial automation arrangement during a projection phase to form a plurality of projected components each allocated a station name and a number of projected properties in the project;

ascertaining, by the configuration component of the industrial automation arrangement, a number of or all components of the plurality of components of the industrial automation arrangement which can be reached via the data network during one of a startup phase and an operating time of the industrial automation arrangement;

retrieving and storing, by the configuration component of the industrial automation arrangement, information about respective actual properties of the ascertained components from the plurality of components of the industrial automation arrangement during one of the startup phase and the operating time of the industrial automation arrangement;

determining, by the configuration component of the industrial automation arrangement, a respective similarity value for each ascertained component of the industrial automation arrangement in relation to the plurality of projected components using a degree of match between the actual properties of the ascertained components of the industrial automation arrangement and the plurality of projected properties of the plurality of projected components of the industrial automation arrangement during one of the startup phase and the operating time of the industrial automation arrangement, each respective similarity value being formed from comparisons between a multiplicity of individual properties by adding or multiplying individual property-related similarity values; and assigning, by the configuration component of the industrial automation arrangement, to each of some or all ascertained components of the industrial automation arrangement the projected station name of that projected component of the industrial automation arrangement for which there is a best similarity value during one of the startup phase and the operating time of the industrial automation arrangement.

2. The method as claimed in patent claim 1, wherein the projected properties and actual properties used during the determining step are vicinity relationships with other instances of the components.

3. The method as claimed in patent claim 1, wherein the projected components and the ascertained components are each distinguished according to device types; and wherein best similarity values are each determined between projected and ascertained components of a same device type during the determining step and are used during the assigning step.

4. The method as claimed in patent claim 3, wherein the ascertaining step comprises searching for components of the plurality of components of at least one previously specified device type.

5. The method as claimed in patent claim 1, wherein during the ascertaining step, in those cases in which an ascertained component of the plurality of components has no communication address, this component is assigned a temporarily valid communication address at least for a period during which a subsequent step is performed.

6. The method as claimed in patent claim 1, wherein the determining step comprises creating at least one similarity matrix, wherein cells of the similarity matrix are each utilizable to store a similarity value between a projected and an ascertained instance of the plurality of components.

7. The method as claimed in patent claim 1, wherein a communication protocol PROFINET IO is implemented in the data network.

8. The method as claimed in patent claim 7, wherein during the retrieving and storing step, standardized data records are retrieved from each of the ascertained components of the plurality of components as a source for the information.

9. The method as claimed in patent claim 1, wherein during the assigning step, prior to the assignment, a query message is output to a user at least in cases in which a predefined interval value between a best and a next best similarity value is undershot.

10. The method as claimed in patent claim 1, wherein fuzzy logic is implemented to at least one of create and evaluate the best similarity value.

11. A configuration component of an industrial automation arrangement for assigning a respective station name to a plurality of components of the industrial automation arrangement, comprising:
a processor; and
memory;
wherein the plurality of components are connected to the configuration component of the industrial automation arrangement by a data network;
wherein single instances or all of the plurality of components are recorded in a project for the configuration component of the industrial automation arrangement as projected components;
wherein the projected components of the plurality of components are each allocated a station name and a number of projected properties in the project;
wherein the configuration component of the industrial automation arrangement is configured such that, during one of a startup phase and an operating time of the automation arrangement, the configuration component of the industrial automation arrangement:
ascertains a number of or all components of the plurality of components which are reachable via the data network;
retrieves and stores information about respective actual properties of the ascertained components of the plurality of components from the plurality of components;
determines a respective similarity value for each ascertained component of the plurality of components in relation to the projected components using a degree of match between the actual properties of the ascertained components of the plurality of components and projected properties of the projected components, each respective similarity value being formed from comparisons between a multiplicity of individual properties by adding or multiplying individual property-related similarity values; and
assigns to each of some or all ascertained components the projected station name of that projected component for which there is a best similarity value.

12. The configuration component as claimed in patent claim 11, wherein the configuration component of the industrial automation arrangement is further configured to determine vicinity relationships between the ascertained components and to relate them to projected vicinity relationships between projected instances of the plurality of components.

13. The configuration component as claimed in patent claim 11, wherein the projected components and components of the plurality of components which are actually arranged in the data network each have an associated device type; and
wherein the configuration component of the industrial automation arrangement is further configured such that similarity values are each determined between projected and ascertained components of a same device type during said determining and are used during said ascertaining.

14. The configuration component as claimed in patent claim 11, wherein the projected components and components of the plurality of components which are actually arranged in the data network each have an associated device type; and
wherein the configuration component of the industrial automation arrangement is further configured such that similarity values are each determined between projected and ascertained components of a same device type during said determination and are used during said assignment.

15. The configuration component as claimed in patent claim 13, wherein the configuration component of the industrial automation arrangement is further configured such that at least one device type is prescribable; and wherein said ascertainment comprises searching only for components of the plurality of components of at least one specified device type and said determination comprises determining only similarity values between projected and actual components of a same type.

16. The configuration component as claimed in patent claim 11, wherein the configuration component of the industrial automation arrangement is further configured to assign a temporarily valid communication address to such instances of the ascertained components as having no valid communication address.

17. The configuration component as claimed in patent claim 11, wherein the configuration component of the industrial automation arrangement includes has a similarity matrix for storing the similarity values determined in said determination; and wherein each cell of the similarity matrix is configured to store a similarity value between a projected and an ascertained instance of the plurality of components.

18. The configuration component as claimed in patent claim 11, wherein the configuration component of the industrial automation arrangement is further configured to utilize a communication protocol PROFINET IO for communication with ascertained instances of the plurality of components.

19. The configuration component as claimed in patent claim 17, wherein the configuration component of the industrial automation arrangement is further configured to retrieve standardized data records from the ascertained components; and wherein the configuration component of the industrial automation arrangement is further configured to use the retrieved standardized data records as a source for information about respective actual properties of respective ascertained components.

20. The configuration component as claimed in patent claim 11, wherein the configuration component of the industrial automation arrangement is further configured to output a query message at least in those cases prior to said assignment during which a predefined interval value between the best similarity value and a next best similarity value is undershot.

21. The configuration component as claimed in patent claim 11, wherein the configuration component of the industrial automation arrangement is set up to utilize fuzzy logic to at least one of create and evaluate similarity values.

* * * * *